Patented Oct. 15, 1940

2,218,238

UNITED STATES PATENT OFFICE 2,218,238

POLYVINYL ACETAL RESIN SHEETS CONTAINING METHOXYETHYL MALEATE

Jack J. Gordon, Kingsport, Tenn., assignor to Eastman Kodak Company, Rochester, N. Y., a corporation of New Jersey No Drawing. Application October 20, 1939, Serial No. 300,431

4 Claims. (Cl. 260—36)

This invention relates to polyvinyl acetal resin sheets, and more particularly to sheets suitable for the manufacture of safety glass.

One object of my invention is to produce compositions of matter which can be made into permanently transparent sheets suitable for use in laminated, shatter-proof glass. Another object is to produce compositions which can be rolled, extruded, molded, or otherwise worked into relatively thick sheets and massive plastics. Other objects will hereinafter appear.

I have discovered that methoxyethyl maleate is a useful plasticizer for polyvinyl acetal resins, such, for instance, as polyvinyl acetaldehyde acetal resins, polyvinyl formaldehyde acetal resins, polyvinyl formaldehyde-acetaldehyde mixed acetal resins, polyvinyl butyraldehyde acetal resins, and polyvinyl acetaldehyde-butyraldehyde mixed acetal resins.

Moreover, I have discovered that when 40 or more parts of methoxyethyl maleate is used with 100 parts of polyvinyl acetal resin, an unusual and remarkable effect is obtained which I may call "elasticizing." That is to say, a sheet of polyvinyl acetal resin containing about 40 or more parts of methoxyethyl maleate per 100 parts of resin is not only permanently transparent, but it possesses the property which, in the rubber industry, is known as "nerve": namely the property of stretching to a considerable extent when tension is exerted upon it, and returning to its original dimensions when the tension is released. This property renders such sheets, which I shall call "rubbery" sheets, particularly useful in the manufacture of shatter-proof glass.

Sheets for use in laminated glass may be made by dissolving the polyvinyl acetal resin and the methoxyethyl maleate in a suitable volatile solvent or solvent mixture, such, for instance, as acetone, methanol, acetone-methanol mixtures, ethylene chloride-methanol mixtures, etc., about 300 to 500 or more parts of the solvent or solvent mixture being used per 100 parts of the resin. The solution is then cast as a sheet, the volatile solvent evaporated, and the sheet stripped from the casting surface.

Sheets for use in laminated glass may also be made without the use of volatile solvent by extrusion, for example, in the manner set forth in application Serial No. 147,934 of John S. Kimble and Ernest C. Blackard, filed June 12, 1937. For example, 40 or more parts of methoxyethyl maleate and 100 parts of a polyvinyl acetal resin may be mixed in a suitable, jacketed mixer at a low temperature, for example 10° C., and the mixture may then be worked on hot rolls, in the manner described in U. S. Patent 2,048,686 of F. R. Conklin, until complete homogenization has taken place. The mass thus produced may then be extruded through an annular die, and the tube so formed slit to form a sheet.

The polyvinyl acetal resins can be prepared by reacting polyvinyl alcohol with an aldehyde in the presence of an acetal condensation catalyst, e. g., a mineral acid. These resins can also be prepared by simultaneously de-esterifying a polyvinyl aliphatic ester and reacting the de-esterification product with an aldehyde in the presence of a de-esterifying catalyst and acetal condensation catalyst. Mineral acids are catalysts for both de-esterification and acetal formation.

Examples of the preparation of polyvinyl formaldehyde acetal resins may be found in U. S. Patent 1,955,068, Examples 1, 4 and 5; in U. S. Patent 2,036,092, Examples 1, 2, 3, 7 and 8; in British Patent 454,691, Examples 1, 2, 3, 4, 5, 6 and 7; in British Patent 404,279, Example 3; and in British Patent 436,072, Examples 1, 2, 3, 4, 5, 6 and 7.

Examples of the preparation of polyvinyl acetaldehyde acetal resins may be found in U. S. Patent 2,044,730, Example 1; U. S. Patent 1,955,068, Example 2; U. S. Patent 2,036,092, Examples 4, 5 and 6; British Patent 466,598, Examples 1, 2, 3, 4, and 7; British Patent 404,279, Examples 1, 2, 4, 5, 6, 7 and 8; U. S. Patent 1,990,399; and French Patent 808,578, Examples 1, 2 and 3.

Examples of the preparation of polyvinyl formaldehyde acetaldehyde mixed acetal resins may be found in British Patent 430,136, Examples 1, 2, 3, 4, 5 and 6; British Patent 445,565, Example 2; British Patent 465,873, Examples 1, 2, 3, 4, 5, and 6; French Patent 808,586, Examples 1, 2, 3, 4, 5, 6, 12, 13, 14, 15, 16, 17, 18 and 19.

Examples of the preparation of polyvinyl butyraldehyde acetal resins may be found in U. S. Patent 2,044,730, Examples 2, 5 and 6; British Patent 466,598, Example 5; French Patent 813,303, Example 1; French Patent 813,514, Examples 1, 2, 3 and 4; and British Patent 459,878, Examples 1, 2, 5, 6, 7, 8, 9 and 10.

An example of the preparation of a polyvinyl butyraldehyde acetaldehyde mixed acetal resin is given in French Patent 813,303, Example 2.

What I claim as my invention and desire to be secured by Letters Patent of the United States is:

1. A transparent, rubbery sheet comprising 100 parts of a polyvinyl acetal resin and, as an elasticizer therefor, at least 40 parts, approximately, of methoxyethyl maleate.

2. A transparent, rubbery sheet comprising 100 parts of a polyvinyl acetaldehyde acetal resin and, as an elasticizer therefor, at least 40 parts, approximately, of methoxyethyl maleate.

3. A transparent, rubbery sheet comprising 100 parts of a polyvinyl formaldehyde acetal resin and, as an elasticizer therefor, at least 40 parts, approximately, of methoxyethyl maleate.

4. A transparent, rubbery sheet comprising 100 parts of a polyvinyl butyraldehyde acetal resin and, as an elasticizer therefor, at least 40 parts, approximately, of methoxyethyl maleate.

JACK J. GORDON.